United States Patent
Hailey

(10) Patent No.: US 6,664,657 B2
(45) Date of Patent: Dec. 16, 2003

(54) ADVANCED METHOD FOR INCREASING RELIABILITY OF REDUNDANT CURRENT-SHARING POWER SUPPLIES

(75) Inventor: Jeffrey C. Hailey, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 113 days.

(21) Appl. No.: 10/008,673

(22) Filed: Nov. 8, 2001

(65) Prior Publication Data

US 2003/0085622 A1 May 8, 2003

(51) Int. Cl.$^7$ .................................................. H02J 1/00
(52) U.S. Cl. ............................................ 307/52; 307/44
(58) Field of Search ............................. 307/52, 43, 44; 713/340, 300

(56) References Cited

U.S. PATENT DOCUMENTS

| | | | | |
|---|---|---|---|---|
| 4,425,613 A | * | 1/1984 | Shelly | 363/26 |
| 4,618,779 A | * | 10/1986 | Wiscombe | 307/60 |
| 5,834,925 A | * | 11/1998 | Chesavage | 323/272 |
| 5,905,645 A | * | 5/1999 | Cross | 363/65 |
| 5,926,367 A | * | 7/1999 | Gutierrez et al. | 361/695 |
| 6,177,786 B1 | * | 1/2001 | Shimamori | 323/283 |
| 6,191,569 B1 | * | 2/2001 | Arbetter et al. | 323/272 |
| 6,320,771 B1 | * | 11/2001 | Hemena et al. | 363/70 |
| 6,385,024 B1 | * | 5/2002 | Olson | 361/87 |
| 6,491,298 B1 | * | 12/2002 | Criss-Puszkiewicz et al. | 273/148 R |

* cited by examiner

Primary Examiner—Gregory J. Toatley, Jr.
Assistant Examiner—Sharon A. Polk
(74) Attorney, Agent, or Firm—Hamilton & Terrile, LLP; Stephen A. Terrile

(57) ABSTRACT

A method and an apparatus for sharing a load current among a plurality of power supply systems. For each of the plurality of power supply systems an output current and at least one variable representing an operational stress factor associated with the power supply system is measured. The current output of at least one of the plurality of power supplies is adjusted as a function of the at least one measured variable that represents the operational stress factor. The apparatus for sharing a load current among a redundant power supply system includes a first power supply system coupled to a second power supply system. The apparatus also includes a balance circuit configured to receive two inputs. A first input represents a current output of the second power supply system and a second input represents the at least one measured variable associated with the first power supply system. The balance circuit is operable to provide feedback to the first power supply system in response to the received inputs.

12 Claims, 7 Drawing Sheets

ADVANCED METHOD FOR INCREASING RELIABILITY OF REDUNDANT CURRENT-SHARING POWER SUPPLIES

BACKGROUND OF THE INVENTION

1. Field of the Invention

The present invention relates to the field of power supplies. More specifically, the present invention relates to a method and an apparatus for increasing reliability of redundant power supplies.

2. Description of the Related Art

Computer systems are information handling systems that may be designed to give independent computing power to one or a plurality of users. An information handling system, as referred to herein, is defined as an "instrumentality or aggregate of instrumentalities primarily designed to compute, classify, process, transmit, receive, retrieve, originate, switch, store, display, manifest, detect, record, reproduce, handle or utilize any form of information, intelligence or data for business, scientific, control or other purposes." Computer systems may be found in many forms including, for example, mainframes, minicomputers, workstations, servers, clients, personal computers, Internet terminals, notebooks, personal digital assistants, and embedded systems. Personal computer ("PC") systems, such as the International Business Machines (IBM) compatible PC systems, include desktop, floor standing, or portable versions. A typical computer system is a microcomputer that includes a system processor or microprocessor, associated memory and control logic, and a number of peripheral devices that provide input and output for the system. Such peripheral devices often include display monitors, keyboards, mouse-type input devices, floppy and hard disk drives, optical drives, and printers. The number of devices being added to computer systems continues to grow. For example, many computer systems also include network capability, terminal devices, modems, sound devices, voice recognition devices, electronic pen devices, and mass storage devices such as tape drives, CD-ROM drives, or DVDs.

Typically, computer systems are powered by a power supply system that receives and converts alternating current (AC) power to direct current (DC) power that is used to power the computer system components such as the system processor. A power supply system typically includes electrical components for the conversion of available power of one set of characteristics to another set of characteristics to meet specified requirements. Typical application of power supplies include converting raw input power to a controlled or stabilized voltage and/or current for the operation of electronic equipment. A regulated power supply system typically provides a built-in controller to regulate the power output in response to a set point input.

In one type of AC-DC power supply used to supply current at DC voltages, power is converted from an AC power source, such as 120 V, 60 Hz or 220 V, 50 Hz power, from a wall outlet. This is accomplished by first rectifying the AC voltage of the power source to an unregulated DC voltage. The unregulated DC voltage typically has a ripple waveform component. To "smooth" the ripple component, most power supplies incorporate a bulk filter capacitor or bulk reservoir capacitor. Typically, a bulk filter capacitor stores charge during the ripple peaks and releases charge during the low portion of the ripple cycle. In addition, AC-DC power supplies may typically include a DC-DC converter for providing DC power to the computer system within specified tolerances.

To improve the availability and reliability of power supply systems it is well known to configure redundant power supply systems. Typically, in a redundant configuration one or more power supply systems may be coupled to share a load current such that failure of a single power supply system may not substantially affect the load current. FIG. 1 (PRIOR ART) illustrates a typical redundant power supply system configured in a current load sharing arrangement. The redundant power supply system includes power supplies PS1 115 and PS2 116 configured to share the power provided to a load, e.g., an electronics system 110. Typically each of the power supplies is regulated and is configured to share the total current load equally. A current balance circuit 120 accomplishes the task of balancing the current load equally between PS1 115 and PS2 116. A feedback output signal 125 is generated by the current balance circuit 120 in response to receiving the current sense #1 130 and current sense #2 135 inputs. The feedback output signal 125 is provided to control the current output of Power Supply #1 115 such that current sense #1 130 and current sense #2 135 are maintained to be substantially equal.

Traditional configuration of a redundant power supply system, e.g., as illustrated in FIG. 1 (PRIOR ART), typically has not provided sufficient consideration for operational stress factors, e.g., temperature. It is well known that power supply systems operating under a greater operational stress are more likely to fail. In a redundant power supply system configuration what is needed is a load sharing strategy, which considers the operational stress factors in determining the load allocation among the redundant power supply systems to increase the overall reliability and availability.

SUMMARY OF THE INVENTION

In accordance with the present invention, a method of sharing a load current among a plurality of power supply systems and an apparatus thereof is described.

In one embodiment, a method of sharing a load current among a plurality of power supply systems includes measuring an output current and at least one variable representing an operational stress factor associated with the power supply system for each of the plurality of power supply systems. The current output of at least one of the plurality of power supplies is adjusted as a function of the at least one measured variable that represents the operational stress factor.

In one embodiment, the apparatus for sharing a load current among a redundant power supply system includes a first power supply system coupled to a second power supply system. The apparatus also includes a balance circuit configured to receive two inputs. A first input represents a current output of the second power supply system and a second input represents the at least one measured variable associated with the first power supply system. The balance circuit is operable to provide a feedback output to the first power supply system in response to the received inputs.

In one embodiment, a computer system includes a processor, a memory coupled to the processor and a plurality of power supply systems configured to implement the method of sharing a load current, the load being the power provided to the processor and the memory. The plurality of power supply systems include a first sensor to measure a current output of each of the plurality of power supply systems and a second sensor to measure at least one variable representing an operational stress factor associated with each of the plurality of power supply systems. The plurality of power supply systems also include a controller configured to receive inputs from the first and second sensor. The controller is operable to adjust the current output of at least one of the plurality of power supply systems in response to the received inputs.

In one embodiment, a computer system includes a processor, a memory coupled to the processor and a redundant power supply system configured to implement the method of sharing a load current, the load being the power provided to the processor and the memory. The redundant power supply system includes a first power supply system coupled to a second power supply system. The redundant power supply system also includes a controller configured to receive two inputs and provide a feedback output. The controller is configured to receive a first input representing a current output of the second power supply system and a second input representing at least one variable of an operational stress factor associated with the first power supply system. In response to receiving the two inputs the controller provides a feedback output to the first power supply system. The output current of the first power supply system may be adjusted in response to the feedback output signal received from the controller.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

The following description of the invention is intended to be illustrative only and not limiting.

A plurality of power supply systems that incorporate a method and apparatus configured to implement a current load sharing method described below may be advantageously included in virtually any electronic system 110 and/or electrical device (not shown) that is typically used in high availability/reliability applications. Typical examples of electronic systems 110 in high reliability applications include computer systems, network communications systems, industrial electronics such as safety and control systems, commercial electronic systems such as banking, ATM's, and fire/security systems. The power supply systems, e.g., PS1 115 and PS2 116, may also be incorporated (or embedded) in electrical devices used in high availability applications such as military equipment, aircraft's, medical equipment, safety systems and even space vehicles. In one embodiment, the power supply systems, such as PS1 115 and PS2 116, which are configured in accordance with the present invention, may be advantageously included in an electronic system to potentially improve the overall system reliability and availability.

Figure 1:
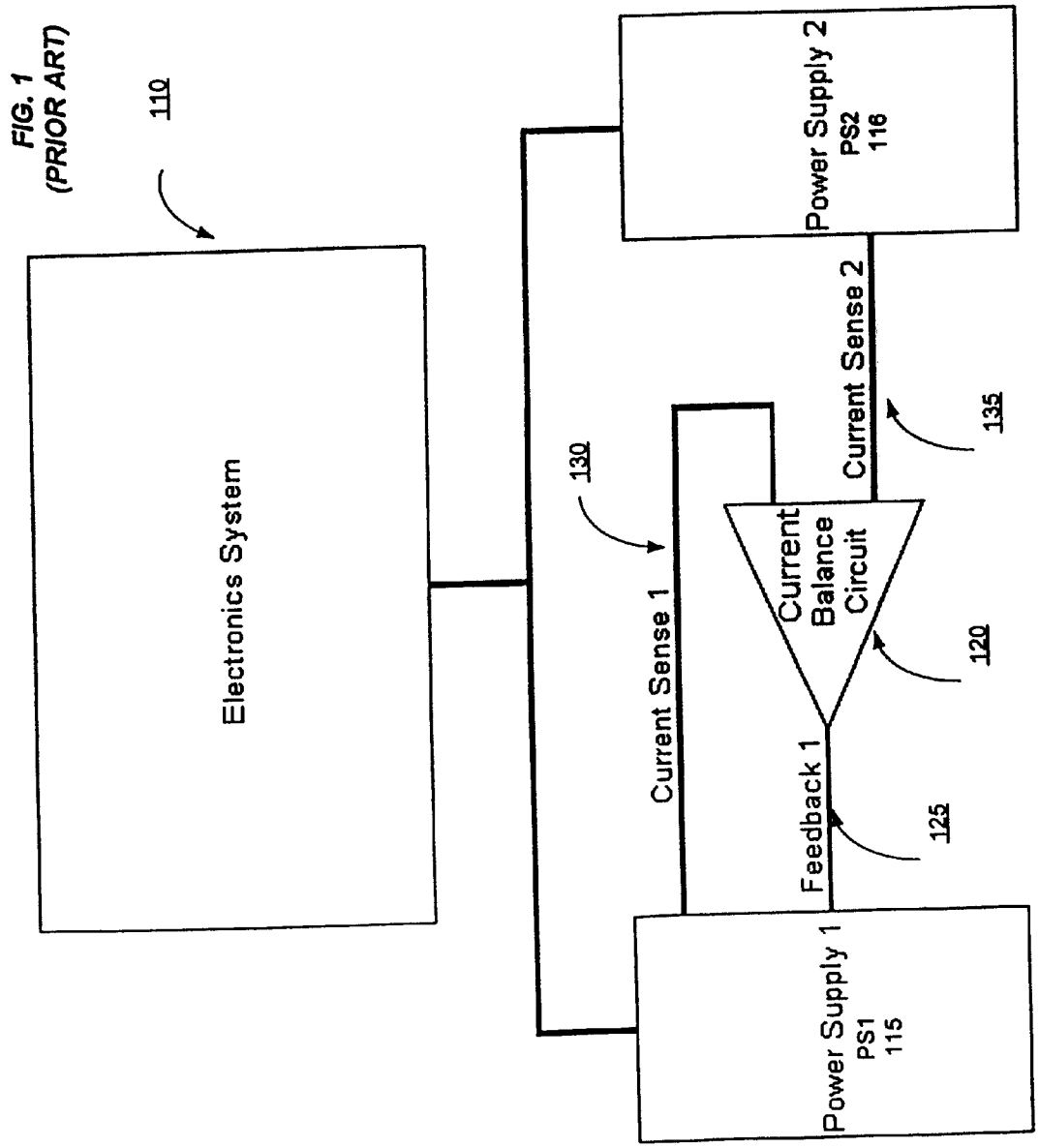
FIG. 1 (PRIOR ART) illustrates a block diagram of an electronic system having a plurality of power supply systems configured in accordance with the present invention.
Figure 2:
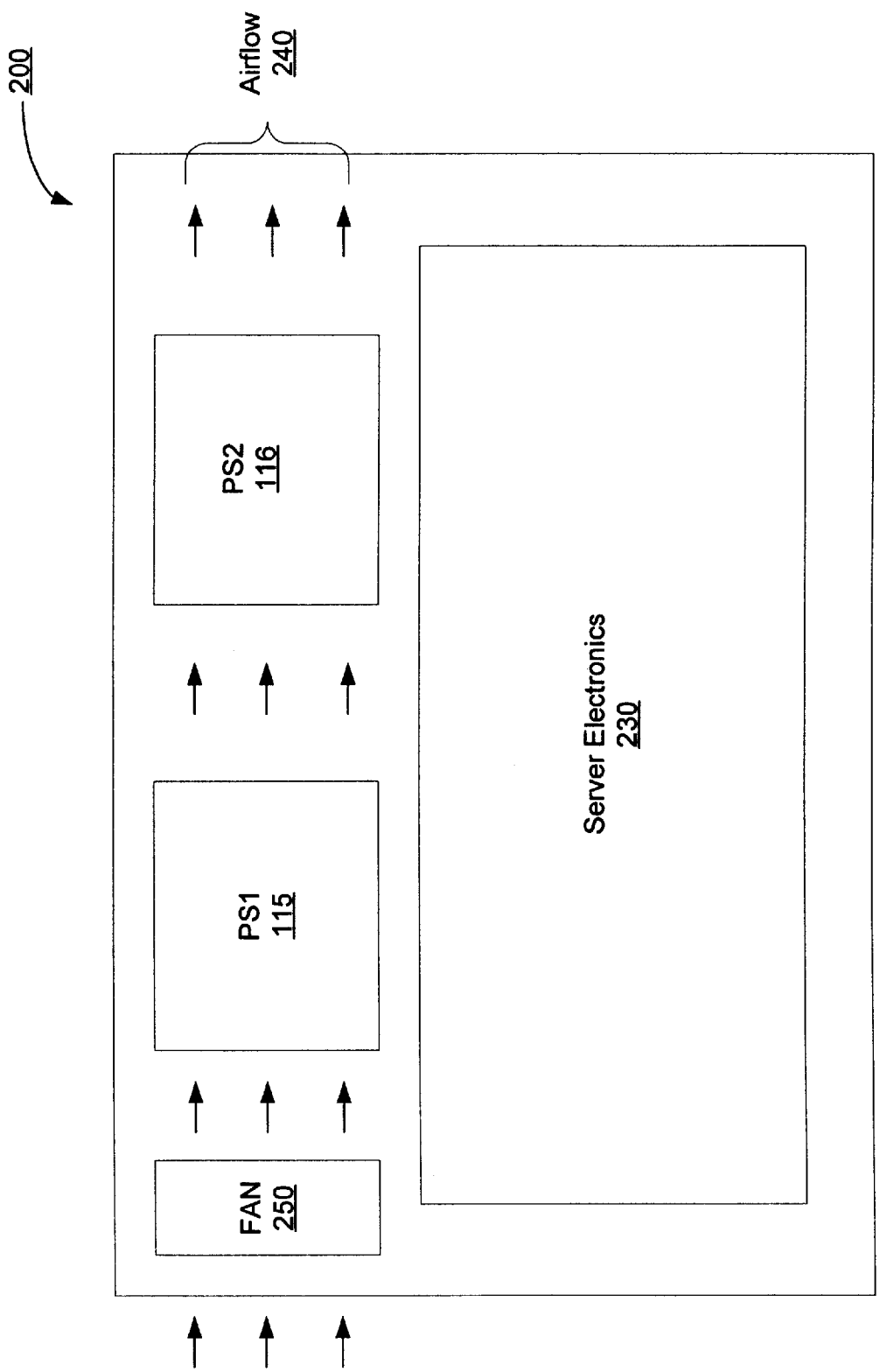
FIG. 2 shows a block diagram of a redundant power supply system configured in accordance with the present invention, for a server computer.

Referring to FIG. 2, a block diagram illustrates one embodiment of a power supply system unit 200 for a server computer system. The height of the power supply unit 200 is 1U and is typically mounted in a server chassis. The power supply system unit 200, in one embodiment includes two power supply systems, e.g., PS1 115 and PS2 116, preferably configured in a redundant configuration. In one embodiment, PS1 115 and PS2 116 are placed in a substantially linear alignment, the linear alignment being substantially aligned with a direction 240 of airflow. A fan 250 may be used to control the direction 240 and the amount of the airflow. For each of the PS1 115 and PS2 116 power supply systems, an output current is measured. In one embodiment, a total current output, e.g., PS1 115 and PS2 116 combined, and a current output of one power supply, e.g., PS1 115 is measured. In addition, at least one variable representing an operational stress factor, e.g., temperature, is also measured. In one embodiment, the PS1 115 and PS2 116 power supply systems include an internal temperature sensor. In one embodiment, the air temperature measured at an exit point of the airflow across PS1 and PS2 is used.

When PS1 115 and PS2 116 are operational, they generate heat. Typically, a convection based air cooling mechanism is used to transfer heat from the power supply system unit to the air surrounding the power supply system. As the air enters the server chassis, which houses the power supply unit, the temperature of the air is substantially equal to the ambient temperature. As the air flows across PS1 115, which is at a higher temperature than the ambient air, cooling occurs. Thus, the temperature of the air exiting PS1 115 is higher than the temperature of the incoming air. The incoming air temperature for PS2 116 is thus higher than the incoming air temperature for PS1 115, e.g., ambient temperature. PS2 116 experiences a higher operational stress compared to PS1. In a traditional redundant power supply system PS1 and PS2 share the load current equally. PS2 116 would typically be susceptible to an increased failure rate due to the higher operational stress.

The amount of heat generated by the power supply system is a function of several factors such as power supply output power, input/output voltage, output current, and conversion efficiency. In one embodiment, the PS1 and/or PS2 current output is adjusted as a function of the at least one measured variable, e.g., PS1 and/or PS2 temperature. The load sharing method may be optimized to share the operational stress rather than the current load. For example, since PS2 116 experiences a higher operational stress compared to PS1 115, PS1 115 is designed to carry a higher current load compared to PS2 116. In one embodiment, the current output of PS1 and/or PS2 is adjusted so that the PS1 and PS2 temperatures are balanced. In another embodiment, the ratio of incoming/exiting airflow temperature differential for PS1 115 and PS2 116 is made to be expressed as a mathematical function, e.g., may be linearly proportional to the ratio of the current output of PS1 115 and PS2 116. In yet another embodiment, the current output of PS1 and/or PS2 is adjusted so that PS1 and PS2 temperatures, as measured by an internal sensor, are made equal.

In addition to output current and temperature there are a variety of additional variables, factors and/or indicators which contribute to the operational stress of a power supply system. Typical examples of additional factors contributing to the operational stress, may include power output, forced or natural airflow, component parameters (e.g., MOSFET RDS-ON resistance), duty cycle, switching frequency, and input voltage. In a more complex power supply system, a plurality of operational stress indicators may be used and weighted to optimize the operational stress sharing between various redundant power supply systems. For example, in one embodiment, output current of PS1 115 and/or PS2 116 may be adjusted to balance temperature and duty-cycle of PS1 115 and PS2 116.

Figure 3A:
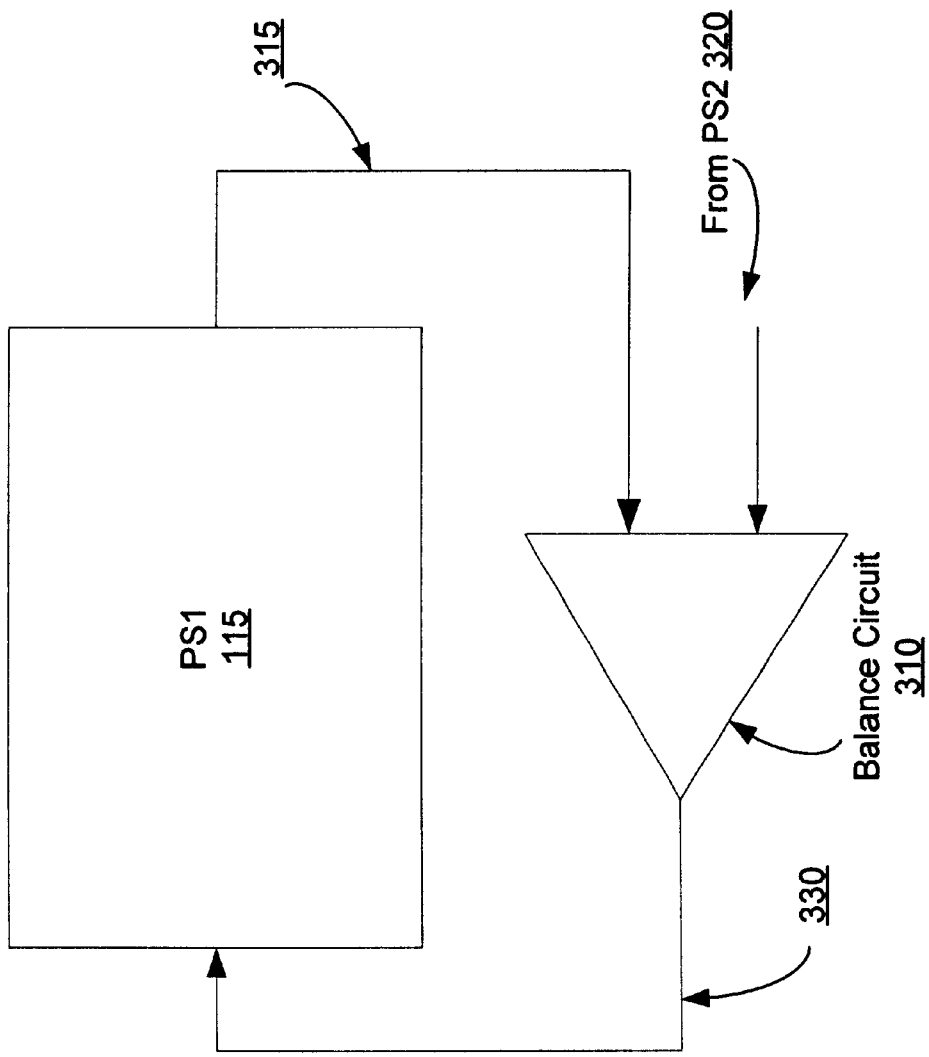
FIG. 3A, and FIG. 3B illustrate various embodiments of an optimization strategy for sharing a load current in a redundant power supply system.

Referring to FIG. 3A, an illustrative block diagram of an optimization strategy for sharing a load current for a redundant power supply system is shown. In this embodiment, the redundant power supply system includes a first power supply system, e.g., PS1 115, coupled to a second power supply system, e.g., PS2 116 (not shown), to share the load current. In this embodiment, the redundant power supply system includes a balance circuit 310, which has two inputs and an output. The first input 315 of the balance circuit represents a variable of an operational stress factor associated with the first power supply system, e.g., a first power supply temperature input. The second input 320 of the balance circuit represents a variable of an operational stress factor associated with the second power supply system, e.g., a second power supply temperature input. The balance circuit 310 is configured to receive the first 315 and second 320 input, process the received inputs and generate an output 330 to balance the operational stress of the redundant power supply system. The balance circuit output 330 is provided as a feedback signal to the first power supply system, e.g., PS1 115, in response to the first and second inputs.

Figure 3B:
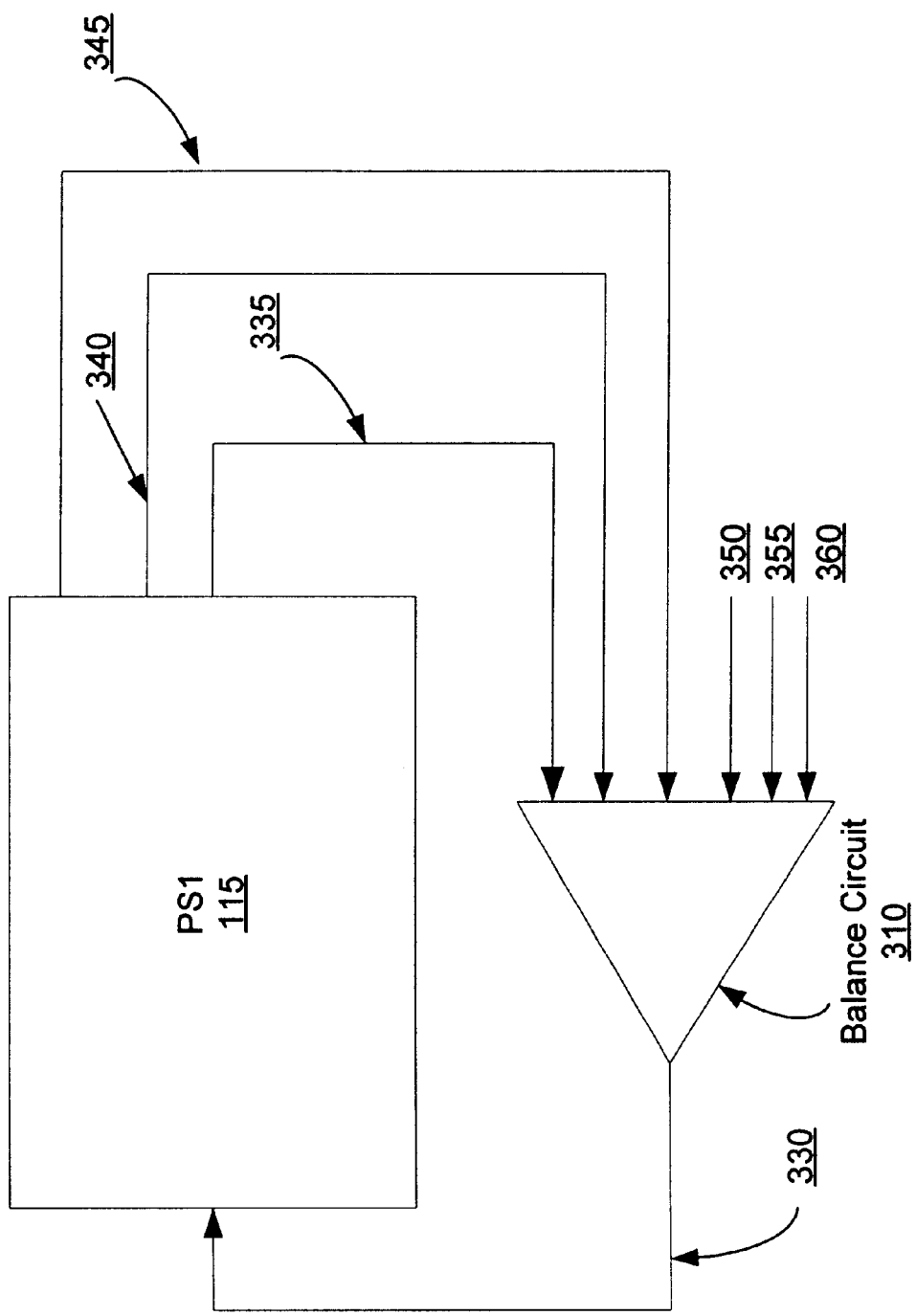

Referring to FIG. 3B, an illustrative block diagram of a multi-factor optimization strategy for sharing a load current for a redundant power supply system is shown. In this embodiment, the redundant power supply system includes a first power supply system, e.g., PS1 115 coupled to a second power supply system, e.g., PS2 116 (not shown) to share the load current. In this embodiment, the redundant power supply system includes a balance circuit 310, which has a plurality of inputs, e.g., six, and an output. The first input 345 of the balance circuit 310 represents a variable of an operational stress factor associated with the first power supply system, e.g., a duty cycle input. The second input 340 of the balance circuit represents a second variable of an operational stress factor associated with the first power supply system, e.g., a current output of the first power supply system. The third input 335 of the balance circuit 310 represents a third variable of an operational stress factor associated with the first power supply system, e.g., a temperature input. The fourth 350, fifth 355 and sixth 360 inputs of the balance circuit respectively represent a duty cycle, output current and temperature variables of the second power supply system (not shown). The balance circuit 310 is configured to receive the first 345 through sixth 360 input, process the received inputs and generate an output 330 to balance the operational stress of the redundant power supply system. The balance circuit output 330 is provided as a feedback to the first power supply system, e.g., PS1 115, in response to the first 345 through sixth 360 inputs.

Figure 4:
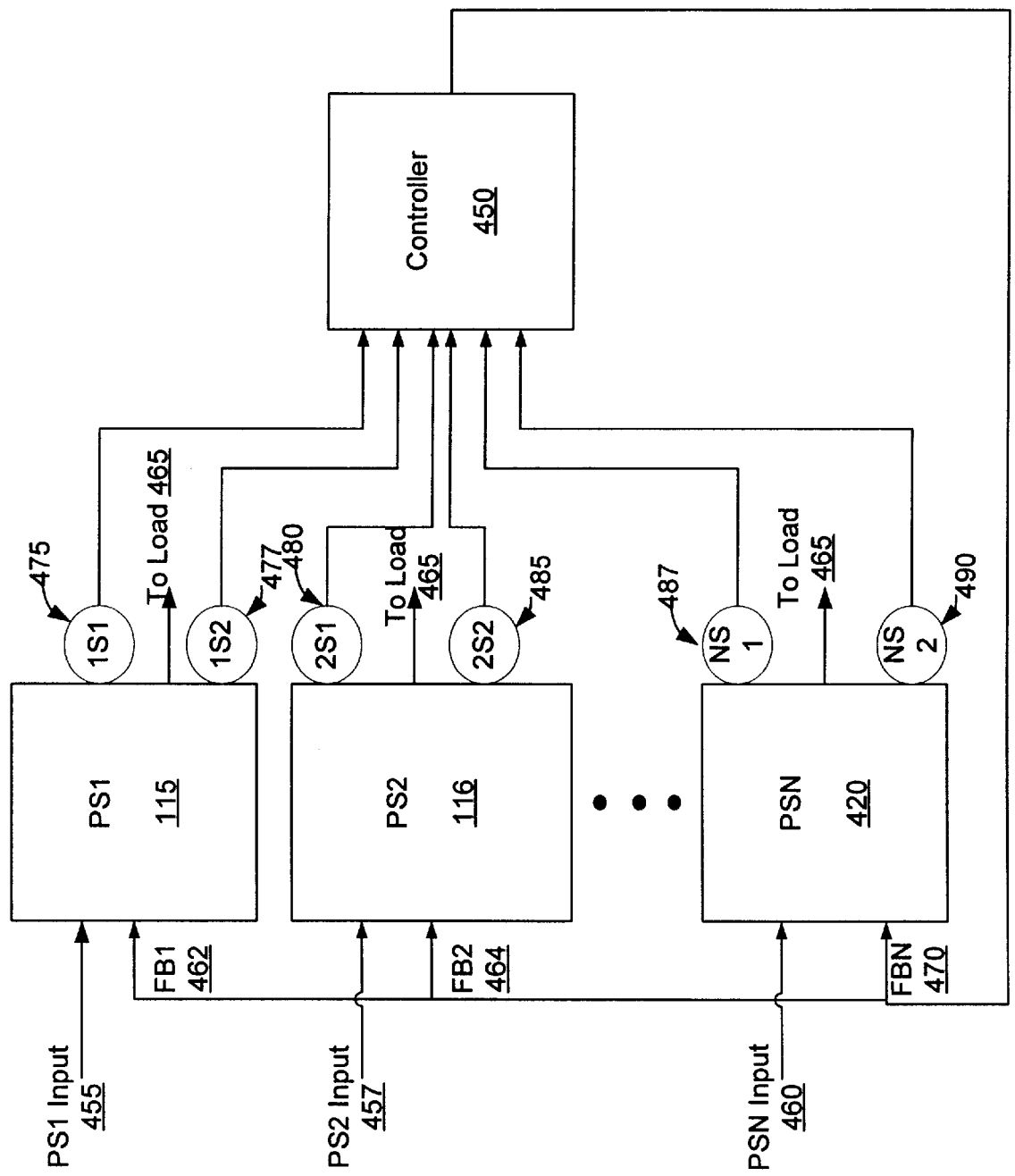
FIG. 4 illustrates another embodiment of an optimization strategy for sharing a load current in a redundant power supply system.

Referring to FIG. 4, an illustrative block diagram for another embodiment of an optimization strategy for sharing a load current for a redundant power supply system is shown. In this embodiment, the redundant power supply system includes a plurality of power supply systems coupled in a load current sharing configuration. In one embodiment, the plurality of power supply system includes N power supply systems PS1 115, PS2 116 and PSN 420 as shown.

PS1 115 typically receives PS1 input voltage signal 455. Similar voltage input signals to PS2 116 are shown as PS2 input 457 and PSN input 460 respectively. In a redundant configuration, all N power supply systems connect in parallel to the load 465. The redundant power supply system also includes a controller 450, which has at least N inputs and an output.

In this embodiment, the controller 450 receives two inputs from sensors measuring variables and/or properties associated with each of the power supply system. For example, a first sensor 1S1 475 measures the current output of PS1 115. The second sensor 1S2 477 measures a variable of an operational stress factor associated with the PS1 115 power supply system, e.g., PS1 115 power supply temperature input. Similarly, 2S1 480 measures the current output of PS2 116 and 2S2 485 measures a variable of an operational stress factor associated with the PS2 116 power supply system, e.g., PS2 power supply temperature input. The controller 450 is configured to receive the sensor inputs from the N power supply systems, process the received inputs and generate an output to balance the operational stress of the plurality of power supply systems. The processing of received inputs may include performing activities such as execution of software programs, performing calculations, executing predefined functions, e.g., mathematical functions and/or expressions. The controller 450 output is provided as a feedback FB1 462 to the PS1 115, FB2 464 to PS2 116 and FBN 470 to PSN 420 power supply systems in response to the sensor inputs.

In another embodiment, in a more complex redundant power supply system, additional sensors (not shown) may be included to measure additional variables of operational stress factors associated with each of the power supply system, e.g., a duty cycle.

Figure 5:
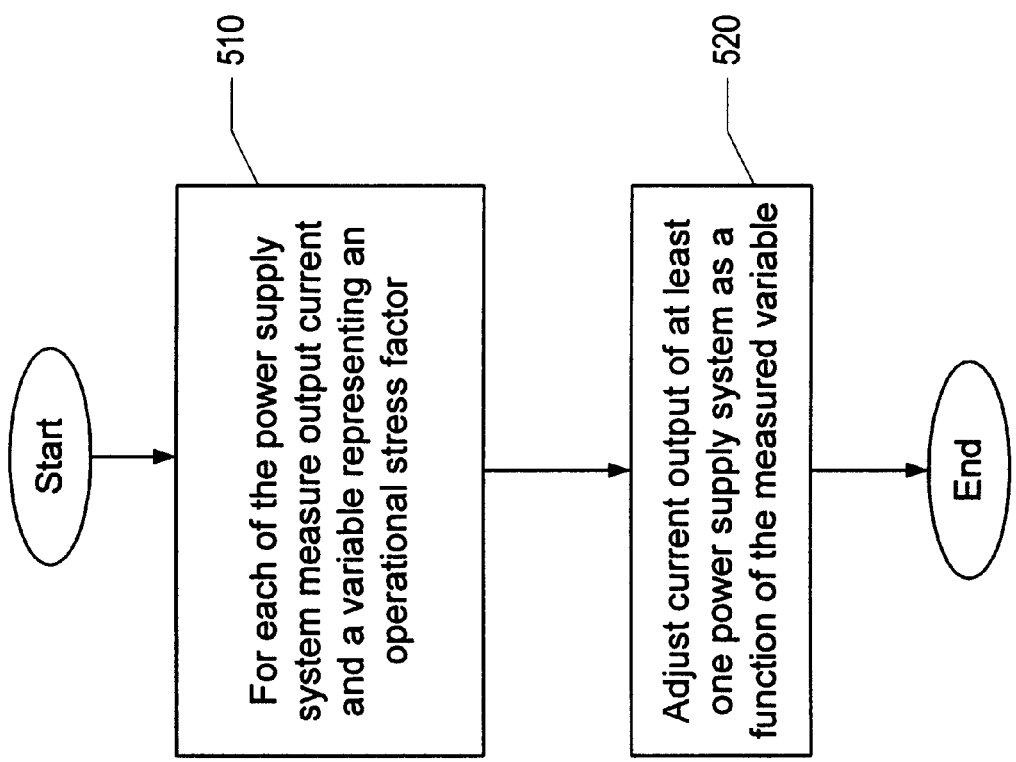
FIG. 5 shows a flow chart of a method for sharing a load current among a plurality of power supply systems.

Referring to FIG. 5, a flow chart for a method for sharing a load current among a plurality of power supply systems is shown. In step 510, for each of the plurality of power supply systems, e.g., PS1 115, an output current is measured. In addition, at least one variable representing an operational stress factor, e.g., temperature of each of the plurality of power supply systems is also measured. In step 520, the current output of at least one of the plurality of power supplies is adjusted as a function of the at least one measured variable, e.g., the temperature. For example, if one of the plurality of power supply system was exhibiting operational stress, measured in terms of a higher temperature, then an adjustment is made to lower the current output of that power supply system to reduce its operational stress. The reduction in current output due to the operational stress in one power supply system may be matched by adjusting a corresponding proportional increase in the current output of other power supply systems to maintain load current.

Figure 6:
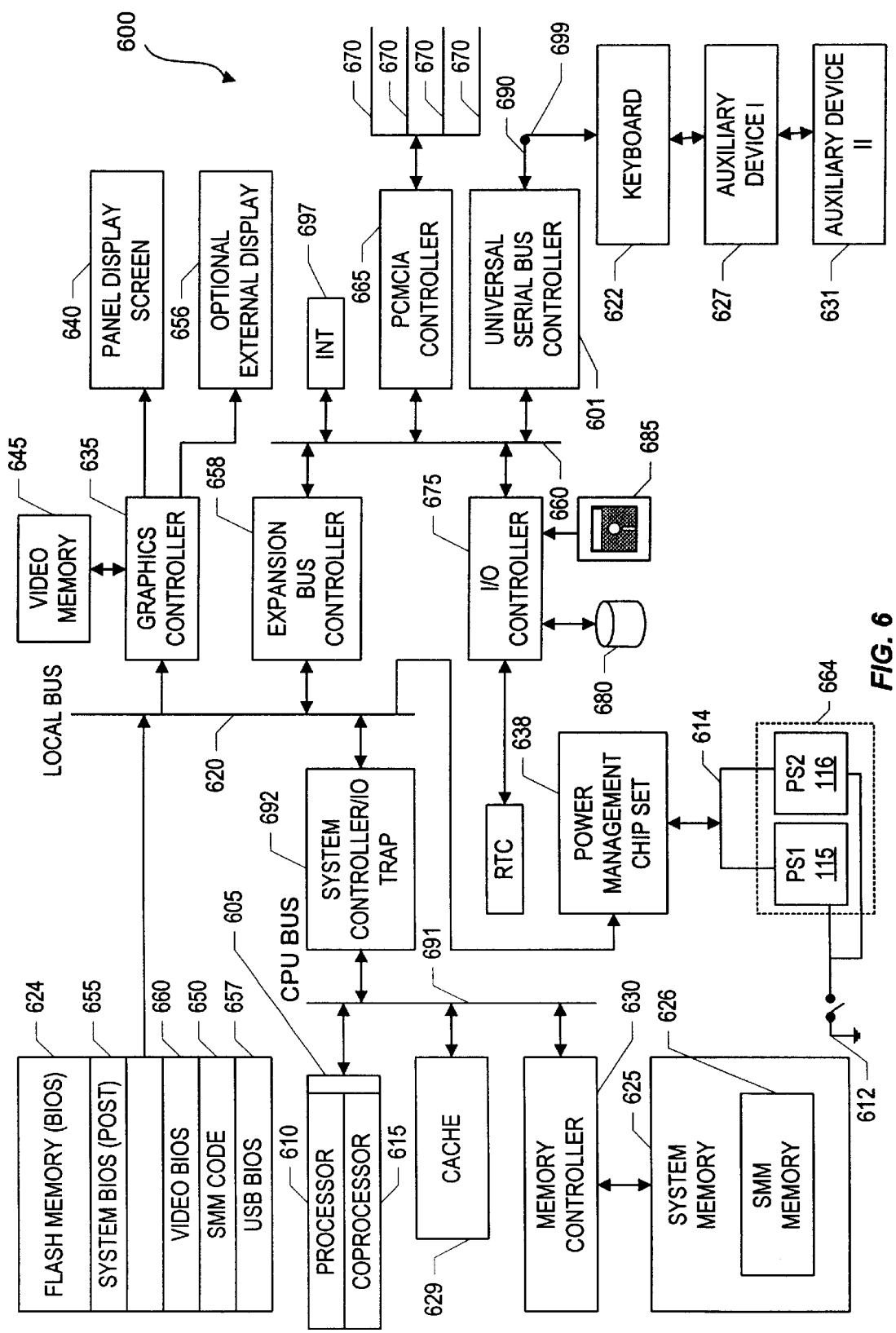
FIG. 6 illustrates a computer system having a plurality of power supply systems configured in accordance with the present invention.

Referring to FIG. 6, a computer system 600 is shown that includes a plurality of power supply systems configured to implement a current load sharing method described below. The load sharing method may be advantageously used for increasing reliability of redundant current-sharing power supplies. The computer system 600 includes a processor ("processor") 605, for example, an Intel Pentium™ class microprocessor or an AMD Athlon™ class microprocessor, having a micro-processor 610 for handling integer operations and a coprocessor 615 for handling floating point operations. Processor 605 is coupled to cache 629 and memory controller 630 via processor bus 691. System controller I/O trap 692 couples processor bus 691 to local bus 620 and is generally characterized as part of a system controller such as a Pico Power Vesuvious or an Intel™

Mobile Triton chip set. System controller I/O trap 692 can be programmed in a well known manner to intercept a particular target address or address range, and, upon intercepting a target address, system controller I/O trap 692 asserts an intercept signal indicating that processor 605 attempted to access the target address.

A main memory 625 of dynamic random access memory ("DRAM") modules is coupled to local bus 620 by a memory controller 630. Main memory 625 includes a system management mode ("SMM") memory area. A (BIOS) memory 624 is coupled to local bus 620. A FLASH memory or other nonvolatile memory is used as BIOS memory 624. A BIOS program (not shown) is usually stored in the BIOS memory 624. The BIOS program includes CD-ROM BIOS 657 software for interaction with the computer system boot devices such as the CD-ROM 682. The BIOS memory 624 stores the system code, which controls some computer system 600 operations.

In its simplest form a computer system may include the processor 605 and the memory 625. The processor 605 is typically enabled to execute instructions stored in the memory 625. The executed instructions typically perform a function. Computer systems may vary in size, shape, performance, functionality and price. Examples of a computer systems may include everything from a pager to a mainframe computer.

A graphics controller 635 is coupled to local bus 620 and to a panel display screen 640. Graphics controller 635 is also coupled to a video memory 645, which stores information to be displayed on panel display 640. Panel display 640 is typically an active matrix or passive matrix liquid crystal display ("LCD"), although other display technologies may be used as well. Graphics controller 635 can also be coupled to an optional external display or standalone monitor display. One graphics controller that can be employed as graphics controller 635 is the Western Digital WD90C14A graphics controller.

A bus interface controller or expansion bus controller 658 couples local bus 620 to an expansion bus 660. In a particular embodiment, expansion bus 660 is an Industry Standard Architecture ("ISA") bus, although other buses, for example, a Peripheral Component Interconnect ("PCI") bus, may also be used. A personal computer memory card international association ("PCMCIA") controller 665 is also coupled to expansion bus 660 as shown. PCMCIA controller 665 is coupled to a plurality of expansion slots 670 to receive PCMCIA expansion cards such as modems, fax cards, communications cards, and other input/output devices. Interrupt request generator 697 is also coupled to ISA bus 660 and issues an interrupt service request over a predetermined interrupt request line after receiving a request to issue interrupt instruction from processor 605.

An I/O controller 675, often referred to as a super I/O controller, is coupled to ISA bus 660. I/O controller 675 interfaces to an integrated drive electronics ("IDE") hard drive 680, a CD-ROM drive 682 and a floppy drive 685. A network interface controller 601 enables the computer system 600 to communicate with a computer network such as an Ethernet 690. The computer network may include a network such as a local area network ("LAN"), wide area network ("WAN"), Internet, Intranet, wireless broadband or the like. The network interface controller 601 forms a network interface for communicating with other computer systems (not shown) connected to the Ethernet 690 for implementing a method of enabling removal of a removable medium of a boot device included in the computer system 600 that is connected to the network of other computer systems. The computer system's networking components generally include hardware as well as software components. Examples of the hardware components include the network interface controller 601 and the Ethernet 690. Examples of the software components, which include messaging services and network administration services, are described below.

The computer system 600 serves as a controller for resolving proprietary and standard event and message structures into a common format for use by the computer network for many management purposes. The computer system 600 is connected with a plurality of computer systems in the network for receiving messages from the computer systems, analyzing the messages and determine an effective utilization of the messages as directed by a user or network administrator. The computer system 600 receives messages in different message formats, organizes the messages, and converts the messages into a common format that assists a user, system administrator, or network administrator in utilizing the information contained in the messages. The converted messages in a common format are distributed at the discretion of a user, network administrator, or system administrator based on user needs or message importance to other system administration applications via a selected communication method. The network administrator controls the type of messages that are communicated over the network. The computer system 600 supports the conversion of messages into the common format to facilitate particular network applications.

Computer system 600 includes a power supply 664, which includes various types of power supplies for converting power from AC-to-DC and/or DC-to-DC. The power supplies may be housed within the computer system 600 enclosure or may be housed external to the computer system 600 enclosure. In one embodiment, the power supplies PS1 115 and PS2 116 may be configured in a redundant configuration. The redundant power supplies provide power to a power plane 614 that supplies power to the various loads, e.g., processor 605.

Computer system 600 also includes a power management chip set 638, which may include, for example, power management chip model PT86C511 manufactured by Pico Power. Power management chip set 638 is coupled to processor 605 via local bus 620 so that power management chip set 638 can receive power control commands from processor 605. Power management chip set 638 is connected to a plurality of individual power planes that supply power to respective devices in computer system 600 such as hard drive 680 and floppy drive 685, for example. In this manner, power management chip set 638 acts under the direction of processor 605 to control the power to the various power planes and devices of the computer. A real time clock ("RTC") 640 is coupled to I/O controller 675 and power management chip set 638 such that time events or alarms can be transmitted to power management chip set 638. Real time clock 640 can be programmed to generate an alarm signal at a predetermined time.

When computer system 600 is turned on or powered up, the computer system 600 enters a start up phase, also referred to as a boot up phase, during which the computer system hardware is detected and the operating system is loaded. During the boot stage, the computer system BIOS software stored in non-volatile BIOS memory 624 is copied into main memory 625 so that it can be executed more quickly. This technique is referred to as "shadowing" or "shadow RAM" as discussed above. At this time, system management mode ("SMM") code 650 is copied into the system management mode memory area 626 of main memory 625. Processor 605 executes SMM code 650 after processor 605 receives a system management interrupt ("SMI") that causes the microprocessor to enter SMM. Additional conditions under which an SMI is generated will be discussed subsequently. It is noted that along with SMM code 650, also stored in BIOS memory 624 and copied into main memory 625 at power up are system BIOS 655 including a power on self test module ("P.O.S.T."), CD-ROM BIOS 657 and video BIOS 660. It will be recognized by those of ordinary skill in the art that other memory mapping schemes may be used. For example, SMM code 650 may be stored in fast SRAM memory (not shown) coupled to the local/processor bus 620.

The computer system 600 may be configured as a server. The computer system 600, in a sever embodiment, provides a service to other computer systems connected to it via a network, e.g., Ethernet 690. In a server embodiment, computer system 600 hardware is typically mounted in cabinets equipped with an industry standard 19" rack. The total number of height units available in a typical rack cabinet is 42 U, or in some cases 48 U. With rack space at a premium, many printed circuit boards use just 1 unit in height, e.g., 1 U, and as a result include a high component density. The higher component density typically increases the heat dissipation requirement. Power supply systems, including redundant configurations, are also available in 1 U height.

Although the method and system of the present invention has been described in connection with the preferred embodiment, it is intended to cover such alternatives, modifications, and equivalents, as can be reasonably included within the spirit and scope of the invention as defined by the appended claims.

What is claimed is:

1. A method of sharing a load current among a plurality of power supply systems, the plurality of power supply systems being located in a substantially linear alignment, the linear alignment being substantially aligned with a direction of an airflow, the method comprising:

for each of the plurality of power supply systems, measuring an output current and at least one variable representing an operational stress factor, the operational stress factor representing an operational stress of a respective power supply system;

adjusting the current output of at least one of the plurality of power supplies as a function of the at least one measured variable, the adjusting taking into account that the operational stress of a power supply system subsequent to a power supply system in the direction of the air flow is greater than the operational stress of a power supply system previous to a power supply system in the direction of the airflow.

2. The method of claim 1, wherein the at least one variable representing the operational stress factor is a temperature of each power supply system.

3. The method of claim 1, wherein the at least one variable representing the operational stress factor is a power output of each power supply system.

4. The method of claim 1, wherein the at least one variable representing the operational stress factor is air flowing across each power supply system.

5. The method of claim 1, wherein adjusting the current output comprises adjusting the current output of each of the plurality of power supplies as a function of the at least one measured variable.

6. The method of claim 1, wherein adjusting the current output comprises adjusting the current output of at least two of the plurality of power supplies as a function of the at least one measured variable.

7. The method of claim 1, wherein the adjustment of the current output results in sharing the load current among the plurality of power supply systems.

8. The method of claim 1, wherein the adjustment of the current output results in controlling the at least one measured variable to be within a predefined range of values.

9. An apparatus for sharing a load current among a plurality of power supply systems, the plurality of power supply systems being located in a substantially linear alignment, the linear alignment being substantially aligned with a direction of an airflow, the apparatus comprising:

a first sensor to measure a current output of each of the plurality of power supply systems;

a second sensor to measure at least one variable representing an operational stress factor associated with each of the plurality of power supply systems, the operational stress factor representing an operational stress of a respective power supply system;

a controller configured to receive inputs from the first and second sensor, the controller operable to adjust the current output of at least one of the plurality of power supply systems in response to the received inputs, the controller taking into account that the operational stress of a power supply system subsequent to a power supply system in the direction of the air flow is greater than the operational stress of a power supply system previous to a power supply system in the direction of the airflow.

10. A computer system comprising:

a processor;

a memory coupled to the processor, a plurality of power supply systems configured to provide power to the processor and the memory, the plurality of power supply systems being located in a substantially linear alignment, the linear alignment being substantially aligned with a direction of an airflow, the plurality of power supply systems comprising:

a first sensor to measure a current output of each of the plurality of power supply systems;

a second sensor to measure at least one variable representing an operational stress factor associated with each of the plurality of power supply systems, the operational stress factor representing an operational stress of a respective power supply system; and a controller configured to receive inputs from the first and second sensor, the controller operable to adjust the current output of at least one of the plurality of power supply systems in response to the received inputs, the controller taking into account that the operational stress of a power supply system subsequent to a power supply system in the direction of the air flow is greater than the operational stress of a power supply system previous to a power supply system in the direction of the airflow.

11. An apparatus for sharing a load current among a redundant power supply system having a first power supply system coupled to a second power supply system, the first and second power supply systems being located in a substantially linear alignment, the linear alignment being substantially aligned with a direction of an airflow such that the airflow passes the first power supply system before passing the second power supply system, the apparatus comprising:

a first input representing a current output of the second power supply system;

a second input representing at least one variable of an operational stress factor associated with the first power supply system, the operational stress factor representing an operational stress of a respective power supply system;

a balance circuit configured to receive the first and second input, the balance circuit operable to provide feedback to the first power supply system in response to the received inputs, the balance circuit taking into account that the operational stress of the first power supply system is greater than the operational stress of the second power supply system.

12. A computer system comprising:

a processor;

a memory coupled to the processor;

a redundant power supply system operable to provide power to the processor and the memory, the redundant power supply comprising:

a first power supply system coupled to a second power supply system, the first and second power supply systems being located in a substantially linear alignment, the linear alignment being substantially aligned with a direction of an airflow such that the airflow passes the first power supply system before passing the second power supply system;

a first input representing a current output of the second power supply system;

a second input representing at least one variable of an operational stress factor associated with the first power supply system, the operational stress factor representing an operational stress of the first power supply system; and a balance circuit configured to receive the first and second input, the balance circuit operable to provide feedback to the first power supply system in response to the received inputs, the balance circuit taking into account that the operational stress of the first power supply system is greater than the operational stress of the second power supply system.

* * * * *